J. REINHART.
INSECT TRAP.
APPLICATION FILED MAR. 8, 1912.
1,056,214.
Patented Mar. 18, 1913.
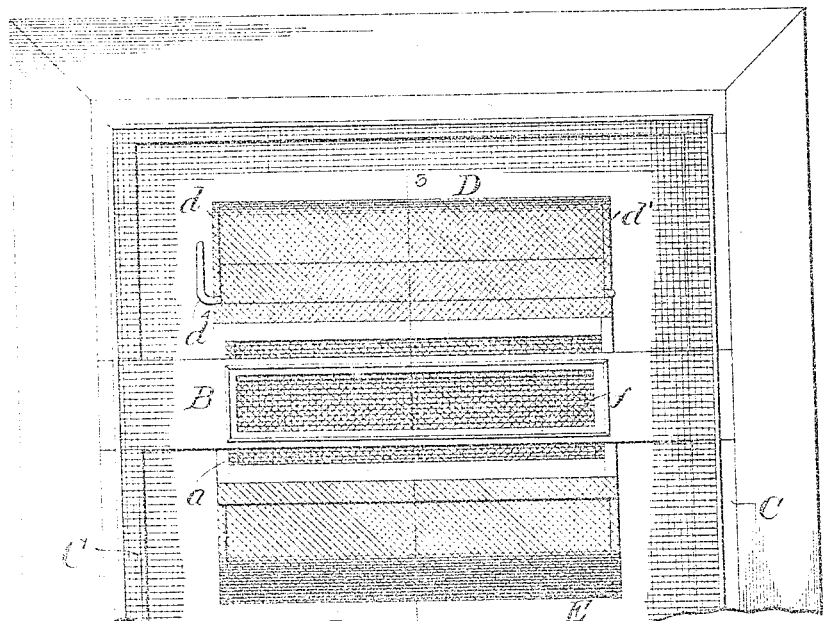
Fig. 1.
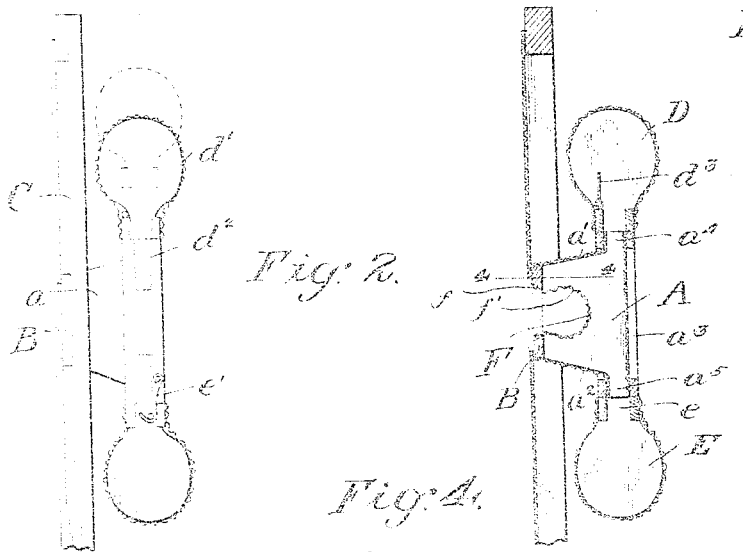
Fig. 2.    Fig. 3.
Fig. 4.
Witnesses    Inventor
             John Reinhart

UNITED STATES PATENT OFFICE.

JOHN REINHART, OF EARLY, IOWA.

INSECT-TRAP.

1,036,214.   Specification of Letters Patent.   Patented Mar. 18, 1913.

Application filed March 8, 1912. Serial No. 682,349.

*To all whom it may concern:*

Be it known that I, JOHN REINHART, a citizen of the United States, residing at Early, in the county of Sac and State of Iowa, have invented new and useful Improvements in Insect-Traps, of which the following is a specification.

My invention relates to the catching and destruction of insects, and has for its object the production of a trap particularly suited for catching flies.

In carrying my invention into effect, I have produced a structure intended and adapted for attachment to a door or window screen, although the invention contemplates the application of the principles set forth to other forms and details within the scope of the appended claims.

The invention consists in the novel construction and arrangement of parts in a trap as hereinafter described and claimed, and shown in the accompanying drawings in which—

Figure 1 is a front view in elevation of the trap mounted upon the inner side of a screen door; Fig. 2 is an end elevation of the same, showing by dotted lines the upper or "live" chamber partly removed; Fig. 3 is a vertical cross-section taken on line 3—3 of Fig. 1; and Fig. 4 is a horizontal section taken on line 4—4 of Fig. 3, showing the admission apertures of the entrance channel.

Referring to the drawings, A represents a main receiving chamber having end walls $a$ by means of which said chamber is mounted upon a supporting strip B which is itself secured to the sides C of a door or window screen, preferably near the upper edge thereof. The upper wall $a'$, the lower wall $a^2$, and the rear wall $a^3$ of said receiving chamber are preferably formed of foraminous material such as ordinary fly screening.

The upper portion of receiving chamber A is provided with an opening $a^4$, communicating with a removable collection chamber D. This collection chamber D has supporting end walls $d$, $d'$, the lower ends of which are provided with a downwardly projecting tongue $d^2$ fitting into a channel formed for the purpose in the end walls of the receiving chamber. The upper and side walls of said collection chamber are preferably covered with fly screening, there being a slot along the lower edge of said collection chamber registering with the opening $a^4$ of the receiving chamber.

Collection chamber D is provided with a valve or flap $d^3$ operated by a handle $d^4$, for closing its opening when the collection chamber is to be removed for cleaning out the live flies therein. A lower collection chamber E is also provided and constructed similarly to collection chamber D, collection chamber E having an upper opening $e$ registering with a lower opening $a^5$ of the receiving chamber. Collection chamber E is held in position upon the receiving chamber by any suitable means such as hooks $e'$, one at either end.

The entrance to the trap is preferably effected by means of an entrance channel F mounted in an opening or slot $f$ on supporting strip B and having upwardly opening admission apertures $f'$ properly spaced throughout its length. I have shown my trap mounted upon the inside of a screen door and having its entrance aperture through the screening of said door so as to catch the flies which crawl up the outer surface of the screen where they accumulate ready to enter the house whenever the door is opened. It is obvious however that if desired the trap may be mounted so as to catch the flies which accumulate in the inside of the screen door or window.

The operation of my trap will be obvious from the foregoing description. Flies and other insects have a tendency to crawl upward and upon reaching the slot or opening $f$ will crawl in and up through apertures $f'$ into receiving chamber A, and thence into collection chamber D. Dead flies will drop through slot or opening $a^5$ into receiving chamber E. The collection chambers may be removed and cleaned out at the proper times.

While I have described in detail a specific embodiment of my invention, I wish it to be understood that changes in details of construction may be made without departing from the spirit of the invention, and all such changes which fall within the scope of the appended claims I contemplate as strictly within the purview of the invention.

Having described my invention what I claim as new, and desire to secure by Letters Patent of the United States is:—

1. An insect trap comprising a substantially vertical supporting strip, a laterally projecting receiving chamber provided with an admission aperture and having end walls secured to said strip, and a removable collection chamber above and communicating with said receiving chamber and having end walls in alinement with the end walls of said receiving chamber, the end walls of said chambers being formed with tongues and sockets in the plane of said end walls so as to secure the parts together and form a practically continuous wall at each end.

2. An insect trap comprising a substantially vertical supporting strip, a laterally projecting chamber provided with an admission aperture and having end walls secured to said strip, a removable collection chamber above said receiving chamber, a removable collection chamber below said receiving chamber having end walls in alinement with the end walls of said receiving chamber, the end walls of said chambers being formed with tongues and sockets in the plane of said end walls so as to secure the parts together and form a practically continuous wall at each end, and means for fastening said lower collection chamber in place.

In testimony whereof I have hereunto set my hand in presence of two subscribing witnesses.

JOHN REINHART.

Witnesses:
 C. S. NEEDHAM,
 H. H. LITTLE.